(12) United States Patent
Kim et al.

(10) Patent No.: US 11,577,785 B2
(45) Date of Patent: Feb. 14, 2023

(54) VEHICLE FRONT STRUCTURE

(71) Applicants: HYUNDAI MOTOR COMPANY, Seoul (KR); KIA MOTORS CORPORATION, Seoul (KR)

(72) Inventors: Hye Yeon Kim, Anyang-si (KR); Yong Kew Kim, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 65 days.

(21) Appl. No.: 17/099,345

(22) Filed: Nov. 16, 2020

(65) Prior Publication Data
US 2022/0033003 A1 Feb. 3, 2022

(30) Foreign Application Priority Data
Jul. 30, 2020 (KR) .......................... 10-2020-0095338

(51) Int. Cl.
*B62D 21/15* (2006.01)
*B62D 27/06* (2006.01)
*B62D 25/20* (2006.01)

(52) U.S. Cl.
CPC ....... *B62D 21/155* (2013.01); *B62D 25/2018* (2013.01); *B62D 27/06* (2013.01)

(58) Field of Classification Search
CPC .............. B62D 21/155; B62D 25/2018; B62D 27/06

USPC ..................................................... 296/203.02
See application file for complete search history.

(56) References Cited

U.S. PATENT DOCUMENTS

| | | | |
|---|---|---|---|
| 7,810,878 B2 * | 10/2010 | Nakamura ............. | B62D 21/11 296/203.02 |
| 9,150,253 B2 | 10/2015 | Watanabe et al. | |
| 9,718,422 B2 * | 8/2017 | An ....................... | B62D 25/082 |
| 2009/0058135 A1 * | 3/2009 | Murata ................ | B62D 25/084 296/203.02 |
| 2013/0320706 A1 * | 12/2013 | Kim .................... | B62D 25/2018 296/187.1 |
| 2016/0368535 A1 * | 12/2016 | Kim ....................... | B62D 21/08 |

FOREIGN PATENT DOCUMENTS

EP 1281603 A2 * 2/2003 ............. B62D 21/11

* cited by examiner

*Primary Examiner* — Pinel E Romain
(74) *Attorney, Agent, or Firm* — Lempia Summerfield Katz LLC

(57) ABSTRACT

A vehicle front structure includes: a front side member; a fender apron member having a front end portion connected to a front end portion of the front side member; a subframe mounting bracket assembly mounted to the front end portion of the front side member and the front end portion of the fender apron member; and a first subframe disposed under the front side member. In particular, the front end portion of the front side member and the front end portion of the fender apron member are connected side-by-side in a width direction of a vehicle.

15 Claims, 14 Drawing Sheets

VEHICLE FRONT STRUCTURE

CROSS-REFERENCE TO RELATED APPLICATION

This application claims priority to and the benefit of Korean Patent Application No. 10-2020-0095338, filed on Jul. 30, 2020, the entire contents of which are incorporated herein by reference.

FIELD

The present disclosure relates to a vehicle front structure, and more particularly, to a vehicle front structure capable of significantly reducing crash pulse severity.

BACKGROUND

The statements in this section merely provide background information related to the present disclosure and may not constitute prior art.

In general, a vehicle includes a front subframe mounted on a vehicle body. The front subframe may support an engine, a transmission, a suspension, etc. The front subframe may serve to facilitate load transfer while providing structural stiffness of the vehicle.

The front subframe may be released from the vehicle body through a releasable joint in order to respond to a frontal impact/collision of the vehicle. In particular, in order to reduce the crash pulse severity of the vehicle, it is desired for the front subframe to be completely released from the vehicle body during the frontal collision of the vehicle. As the front subframe is completely released from the vehicle body through the releasable joint during the frontal collision of the vehicle, the crash pulse severity of the vehicle may be reduced, and as the crash pulse severity of the vehicle is reduced, restraint energy (RTE) may be lowered. RTE refers to the degree of impact load excluding a load absorbed by the vehicle body or the front subframe. As RTE increases, crashworthiness (frontal crash performance) may be reduced. In particular, the most reliable way to lower RTE is that the front side member and the front subframe are deformed into a diamond shape and the front subframe is completely released from the vehicle body during the frontal collision.

A front mounting point of the front subframe may be connected to the front side member through a front joint, a center mounting point of the front subframe may be connected to the front side member through a center releasable joint, and a rear mounting point of the front subframe may be connected to the front side member through a rear releasable joint. As the front subframe moves down below the vehicle during the frontal collision, the center mounting point of the front subframe may be released from the front side member through the center releasable joint, and then the rear mounting point of the front subframe may be released from the front side member through the rear releasable joint.

However, we have discovered that the front subframe according to the related art has often failed to be completely released in the event of the frontal collision of the vehicle since a portion of the vehicle body to which the center releasable joint and/or the rear releasable joint are connected is torn and the center releasable joint and/or the rear releasable joint cannot be completely released from the front side member of the vehicle body. Thus, the front subframe and the front side member cannot be deformed into a diamond shape, resulting in a failure to effectively reduce the crash pulse severity of the vehicle.

The above information described in this background section is provided to assist in understanding the background of the inventive concept, and may include any technical concept which is not considered as the prior art that is already known to those skilled in the art.

SUMMARY

The present disclosure provides a vehicle front structure capable of significantly reducing crash pulse severity by effectively inducing the deformation of a front subframe and a front side member into a diamond shape in the event of a frontal impact/collision, and capable of protecting a passenger compartment safely by sufficiently absorbing crash impact energy.

According to an aspect of the present disclosure, a vehicle front structure for a vehicle may include: a front side member; a fender apron member having a front end portion connected to a front end portion of the front side member; a subframe mounting bracket assembly mounted to the front end portion of the front side member and the front end portion of the fender apron member; and a first subframe disposed under the front side member. The front end portion of the front side member and the front end portion of the fender apron member may be connected side-by-side in a width direction of the vehicle.

The subframe mounting bracket assembly may include a first mounting bracket joined to the front end portion of the front side member, a second mounting bracket joined to the front end portion of the fender apron member, and a reinforcing member connecting the first mounting bracket and the second mounting bracket.

The first mounting bracket may include a mounting wall disposed on a bottom end thereof, the reinforcing member may include a support wall parallel to the mounting wall, and a front mounting hardware member may extend through and be joined to the support wall and the mounting wall.

The front end portion of the fender apron member may have a plurality of flanges attached to the second mounting bracket.

The front subframe may include a front mounting bush located in a front end portion thereof, a rear mounting bush located in a rear end portion thereof, and a center mounting bush located between the front mounting bush and the rear mounting bush, and the front mounting bush may be mounted to the front mounting hardware member through a front fastener.

The center mounting bush may be mounted to the front side member through a center fastener, and the center mounting bush may be made of a material having lower strength than that of the front subframe.

The front side member may have a center mounting portion protruding downwardly from a bottom surface thereof, a center mounting hardware member may be fixed into the center mounting portion, and the center mounting bush may be mounted to the center mounting hardware member through the center fastener.

A floor member may be connected to the front side member, the floor member may have a front end portion joined to the front side member, and the rear mounting bush may be mounted to the front end portion of the floor member through a rear fastener.

A rear mounting hardware member may be mounted to the front end portion of the floor member through a rear reinforcing member and a bulkhead, and the rear mounting bush may be mounted to the rear mounting hardware member through the rear fastener.

The front end portion of the floor member may have an opening extending in a longitudinal direction of the vehicle, and the rear mounting hardware member and a top portion of the rear mounting bush may extend through the opening of the floor member.

The rear reinforcing member may be disposed above the opening of the floor member, and the rear reinforcing member may be made of a material having lower stiffness than that of the rear mounting hardware member, the floor member, and the bulkhead.

The rear reinforcing member may include a support wall to which a bottom surface of the rear mounting hardware member is fixed, the support wall may have a mounting hole through which the rear fastener passes, and a plurality of through holes may be located around the mounting hole.

The bulkhead may be disposed on the rear mounting hardware member to cover the rear mounting hardware member and the support wall of the rear reinforcing member, and the bulkhead may be joined to the rear reinforcing member.

The bulkhead may have a cover wall covering the rear mounting hardware member and the support wall of the rear reinforcing member, the cover wall may have an insertion hole into which a top portion of the rear mounting hardware member is inserted, and a plurality of through holes may be located around the insertion hole.

The front subframe may include a center crossmember, a pair of longitudinal members extending upwardly and obliquely from the center crossmember toward the front of the vehicle, and a front crossmember connecting front end portions of the pair of longitudinal members. Each longitudinal member may have a flat portion extending horizontally from a front end of the center crossmember, and the flat portion may be located at a lower height than a front end portion of the longitudinal member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
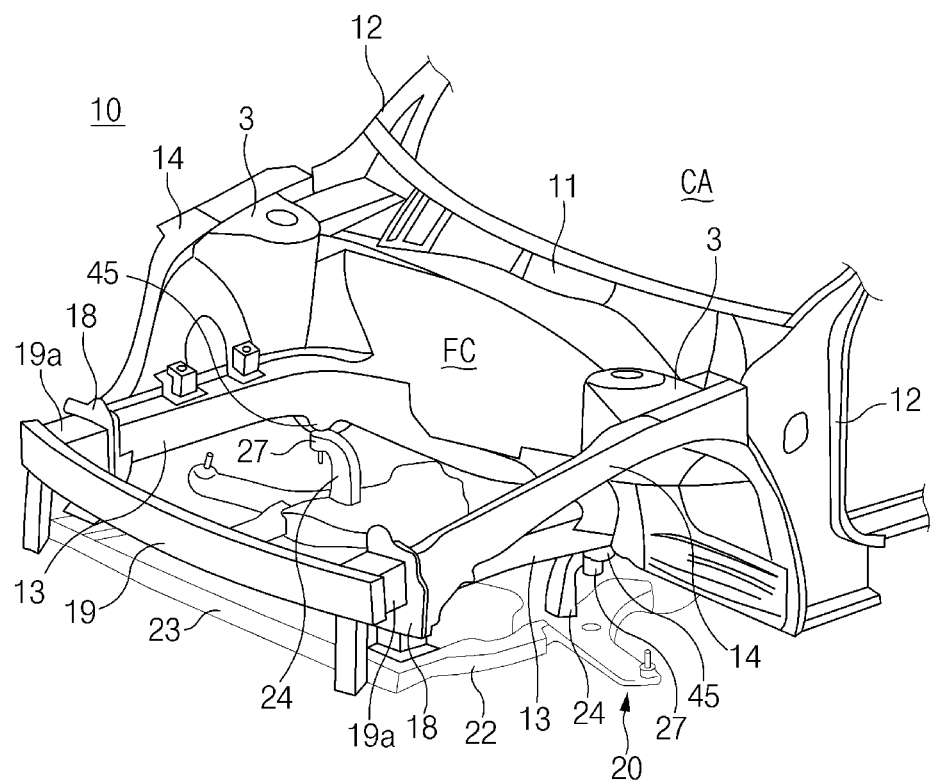
FIG. 1 illustrates a perspective view of a vehicle front structure according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. A detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle front structure 10 according to an exemplary form of the present disclosure may include a dash panel 11, a pair of front pillars 12 disposed on both edges of the dash panel 11, a pair of front side members 13 extending through the bottom of the dash panel 11, a pair of fender apron members 14 connected to the pair of front pillars 12, respectively, and a front subframe 20 disposed under the pair of front side members 13.

The dash panel 11 may divide a front compartment FC from a passenger compartment "CA", and a prime mover such as an internal combustion engine or an electric motor, a transmission, a heat exchanger, and the like may be arranged in the front compartment "FC".

The pair of front pillars 12 may be mounted on both edges of the dash panel 11 by various reinforcing members, brackets, and/or the like.

Figure 13:
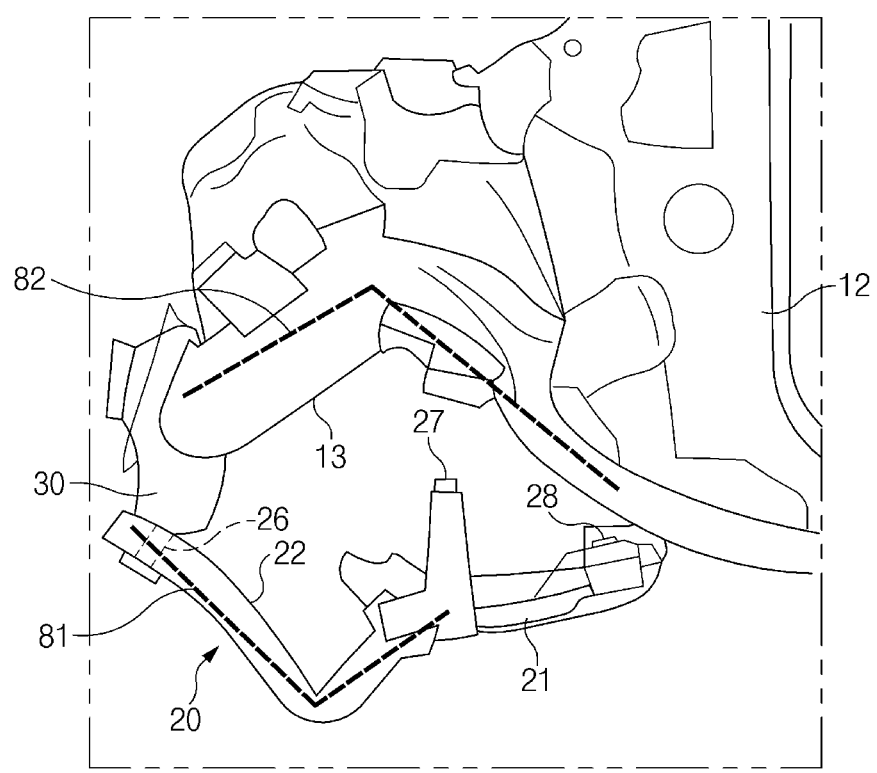
FIG. 13 illustrates the deformation of a vehicle front structure according to an exemplary form of the present disclosure in the event of a frontal collision.

The pair of front side members 13 may be spaced apart from each other in a width direction of the vehicle, and each front side member 13 may extend in a longitudinal direction of the vehicle. Each front side member 13 may extend through the bottom of the dash panel 11. The front side member 13 may have a center mounting portion 45 protruding downwardly from a bottom surface thereof, and a top flange 13b protruding upwardly from a top surface thereof. A center mounting hardware member 42 may be fixed into the center mounting portion 45. The front side member 13 may extend in the longitudinal direction of the vehicle, and an axis of the center mounting portion 45 may extend in a height direction of the vehicle. That is, the axis of the center mounting portion 45 may be perpendicular to an axis of the front side member 13. The center mounting portion 45 may protrude downwardly from the bottom surface of the front side member 13, and thus a sharp change in the bottom surface of each front side member 13 may act as a notch to induce stress concentration. That is, the center mounting portion 45 may act as a notch in the bottom surface of the front side member 13. As illustrated in FIG. 13, when an impact load is transferred to each front side member 13 in the event of a frontal impact/collision of the vehicle, the front side member 13 may be deformed (bent) into an inverted V-like shape (see reference numeral 82 in FIG. 13) by the center mounting portion 45.

Figure 8:
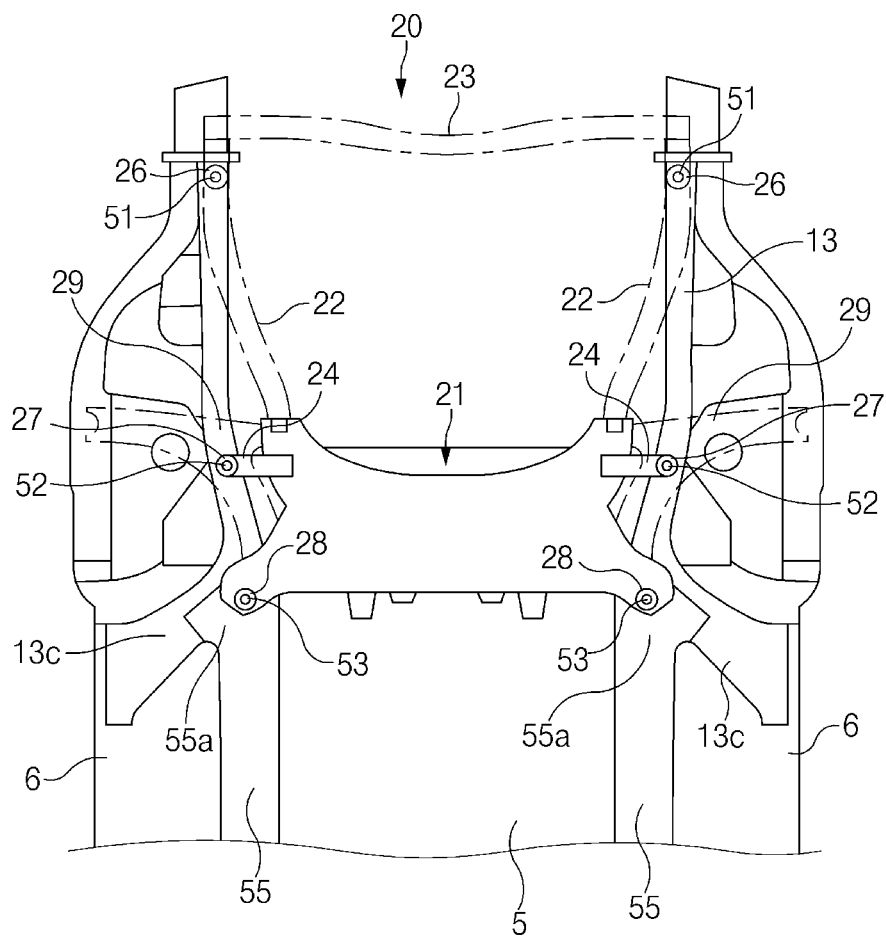
FIG. 8 illustrates a bottom view of a vehicle front structure according to an exemplary form of the present disclosure.

Referring to FIG. 8, the front side member 13 may have an extension portion 13c extending from a rear end portion of the front side member 13 toward the rear of the vehicle, and the extension portion 13c may be curved from the rear end portion of the front side member 13 toward the exterior of the vehicle. A pair of floor members 55 may be attached to a bottom surface of a center floor 5 of the vehicle, and the floor members 55 may be connected to the corresponding front side members 13. In some forms, a front end portion 55a of the floor member 55 and the extension portion 13c of the front side member 13 may be joined by welding, using fasteners, and/or the like. The floor member 55 may be referred to as a rear lower member since it is connected to the rear of the front side member 13 and attached to the bottom surface of the center floor 5. A rear mounting hardware member 43 may be joined to the front end portion 55a of the floor member 55 by welding and/or the like.

The pair of fender apron members 14 may be spaced apart from each other in the width direction of the vehicle, and each fender apron member 14 may extend from the front pillar 12 to a front end portion 13a of the front side member 13.

Figure 3:
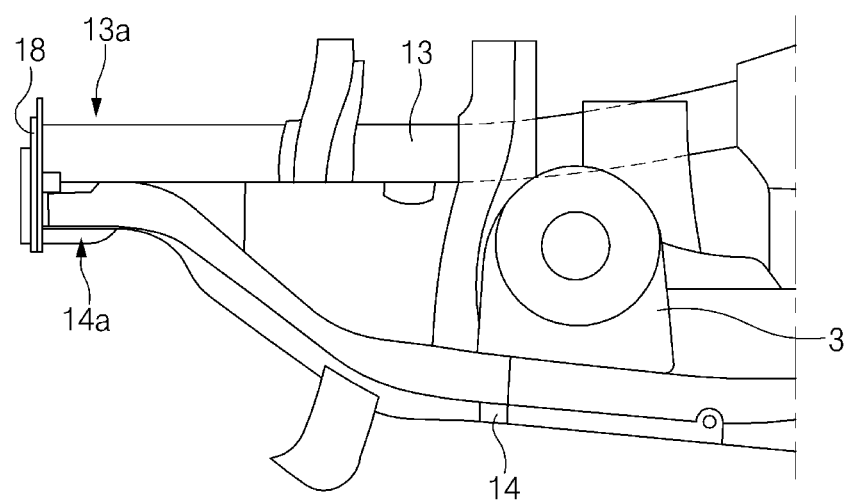
FIG. 3 illustrates a plan view of a left portion of a vehicle front structure according to an exemplary form of the present disclosure.
Figure 14:
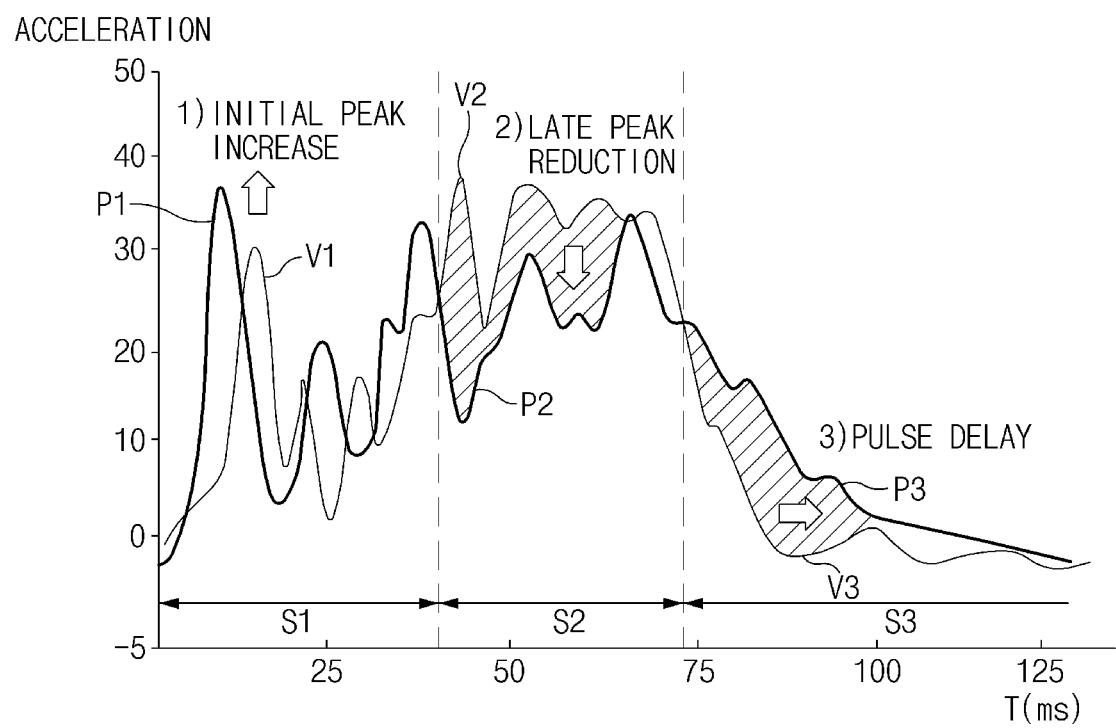
FIG. 14 illustrates a crash pulse.

FIG. 3 illustrates a plan view of a structure in which a front end portion of a left fender apron member is connected to a front end portion of a left front side member. Referring to FIG. 3, the fender apron member 14 may extend from the corresponding front pillar 12 to the front end portion 13a of the corresponding front side member 13. A front end portion 14a of the fender apron member 14 may be overlapped with the front end portion 13a of the corresponding front side member 13, and the front end portion 14a of the fender apron member 14 may be connected to the front end portion 13a of the front side member 13 through a subframe mounting bracket assembly 30. The front end portion 14a of the fender apron member 14 and the front end portion 13a of the front side member 13 may be connected side-by-side in the width direction of the vehicle, and thus the front end portion 14a of the fender apron member 14 and the front end portion 13a of the front side member 13 may form a double box structure. In particular, the front end portion 14a of the fender apron member 14 may be connected to the front end portion 13a of the front side member 13 through the subframe mounting bracket assembly 30. Thus, stiffness and strength of the front side member 13 and stiffness and strength of the fender apron member 14 may be improved. According to an exemplary form of the present disclosure, the front end portion 14a of the fender apron member 14 and the front end portion 13a of the front side member 13 may be connected side-by-side in the width direction of the vehicle, thereby improving the stiffness and strength of the front portion of the vehicle front structure 10. Thus, a frontal NCAP (new car assessment program) pulse may be stabilized, and an initial peak P1 of a crash pulse may be increased as illustrated in FIG. 14.

Figure 5:
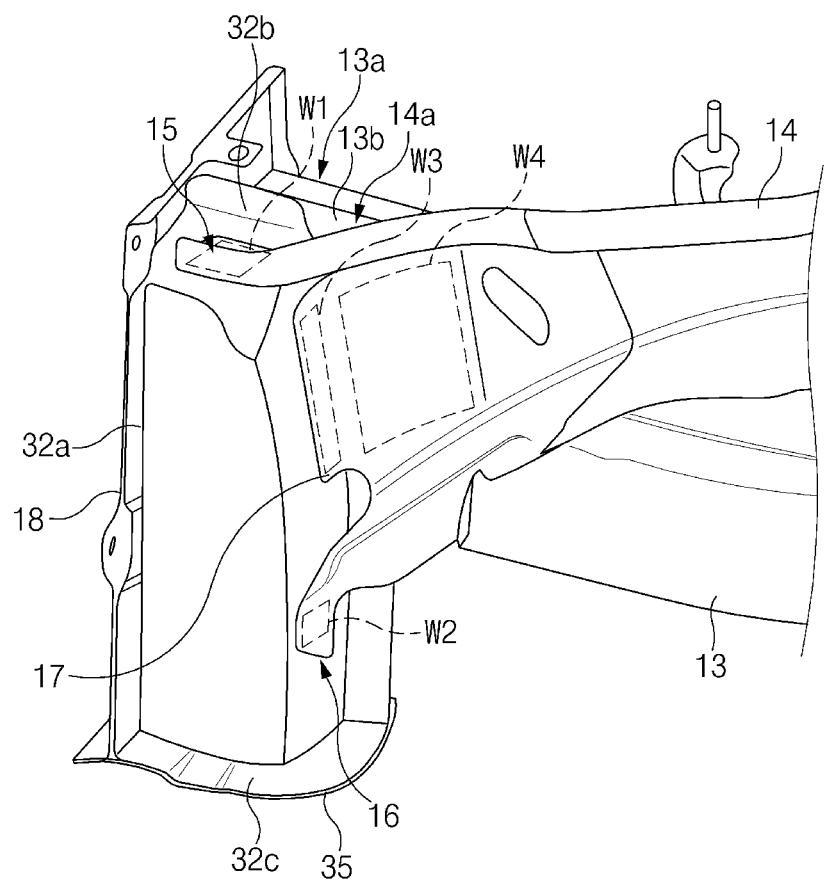
FIG. 5 illustrates a perspective view which is viewed from a direction indicated by arrow A of FIG. 4.

Referring to FIG. 5, the subframe mounting bracket assembly 30 may be mounted to the front end portion 14a of the fender apron member 14 and the front end portion 13a of the front side member 13, and thus the subframe mounting bracket assembly 30 may connect the front end portion 14a of the fender apron member 14 and the front end portion 13a of the front side member 13. The subframe mounting bracket assembly 30 may be joined to a rear surface of a bumper beam mounting bracket 18 by welding, using fasteners, and/or the like.

Figure 4:
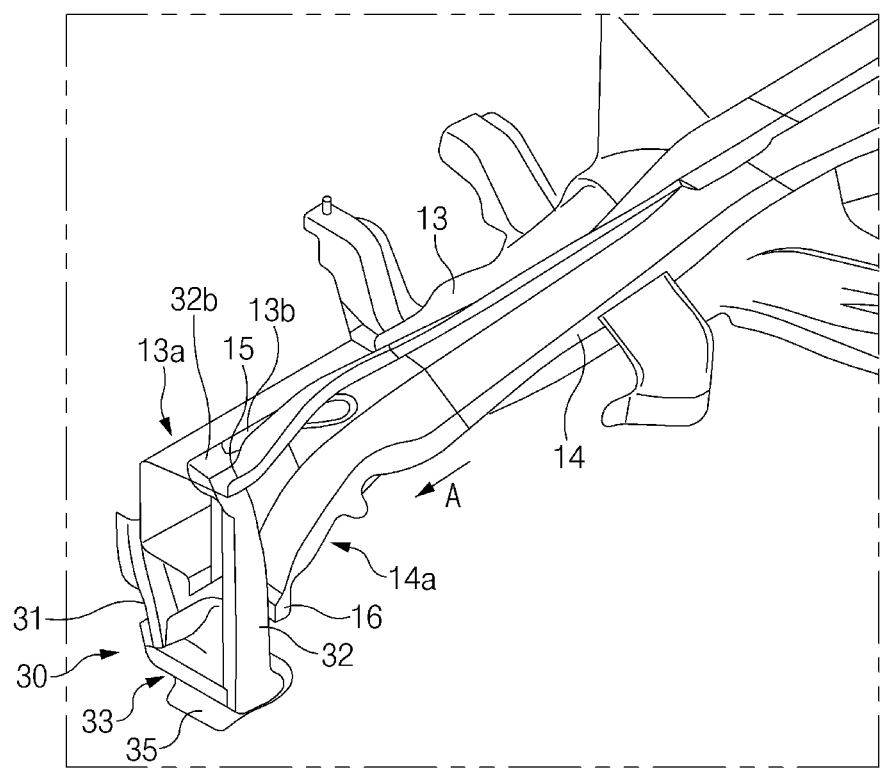
FIG. 4 illustrates a perspective view of the left portion of the vehicle front structure illustrated in FIG. 3.
Figure 6:
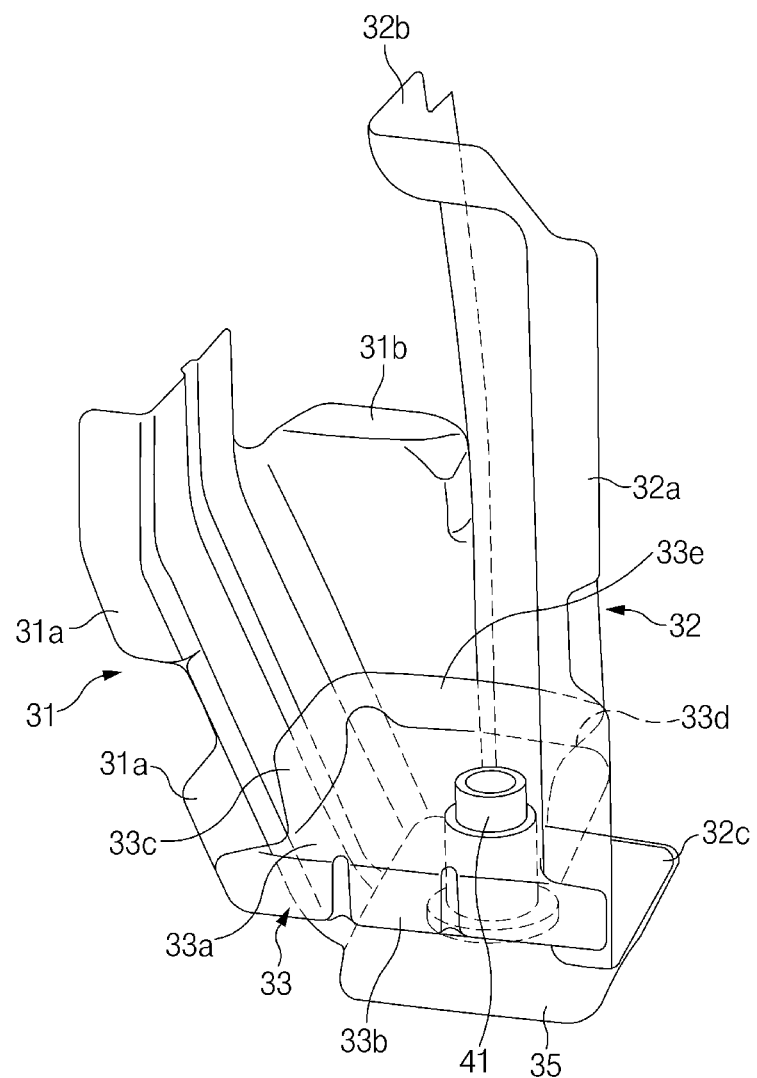
FIG. 6 illustrates a perspective view of a subframe mounting bracket assembly illustrated in FIGS. 4 and 5.

Referring to FIGS. 4 to 6, the subframe mounting bracket assembly 30 may include a first mounting bracket 31 joined to the front end portion 13a of the front side member 13, a second mounting bracket 32 joined to the front end portion 14a of the fender apron member 14, and a reinforcing member 33 connecting the first mounting bracket 31 and the second mounting bracket 32.

Referring to FIG. 4, the first mounting bracket 31 may extend downwardly from the front end portion 13a of the front side member 13. The first mounting bracket 31 may be attached to the front end portion 13a of the front side member 13 by welding, using fasteners, and/or the like. Referring to FIG. 6, the first mounting bracket 31 may include a front flange 31a attached to the bumper beam mounting bracket 18 and a rear flange 31b attached to the front end portion 13a of the front side member 13. The first mounting bracket 31 may have a mounting wall 35 disposed on a bottom end thereof, and the mounting wall 35 may be a flat wall parallel to the bottom of the front side member 13.

Referring to FIGS. 4 and 5, the second mounting bracket 32 may be attached to the front end portion 14a of the fender apron member 14 by welding, using fasteners, and/or the like. Referring to FIG. 6, the second mounting bracket 32 may include a front flange 32a attached to the bumper beam mounting bracket 18, a top flange 32b attached to the top flange 13b of the front side member 13, and a bottom flange 32c attached to the mounting wall 35 of the first mounting bracket 31.

Referring to FIG. 5, the front end portion 14a of the fender apron member 14 may have a plurality of flanges 15, 16, and 17 attached to the second mounting bracket 32. Specifically, the front end portion 14a of the fender apron member 14 may have a top flange 15 extending from a top end of the front end portion 14a, a bottom flange 16 extending from a bottom end of the front end portion 14a, and a middle flange 17 extending from a middle portion of the front end portion 14a. The top flange 15 may be attached to a top surface of the second mounting bracket 32 by welding W1, the bottom flange 16 may be attached to a bottom surface of the second mounting bracket 32 by welding W2, and the middle flange 17 may be attached to a rear surface of the second mounting bracket 32 by welding W3. A sidewall of the front end portion 14*a* of the fender apron member 14 may be attached to a sidewall of the front end portion 13*a* of the front side member 13 by welding W4.

Referring to FIGS. 4 and 6, the reinforcing member 33 may be joined between the first mounting bracket 31 and the second mounting bracket 32 to connect the first mounting bracket 31 and the second mounting bracket 32. Referring to FIG. 6, the reinforcing member 33 may include a support wall 33*a*, a front flange 33*b* located on a front end of the support wall 33*a*, a first side flange 33*c* located on one edge of the support wall 33*a*, a second side flange 33*d* located on the other edge of the support wall 33*a*, and a rear flange 33*e* located on a rear end of the support wall 33*a*. The support wall 33*a* may be a flat wall parallel to the mounting wall 35 of the first mounting bracket 31. The front flange 33*b* may be attached to the bumper beam mounting bracket 18 by welding, using fasteners, and/or the like. The first side flange 33*c* may be attached to the first mounting bracket 31 by welding, using fasteners, and/or the like, and the second side flange 33*d* may be attached to the second mounting bracket 32 by welding, using fasteners, and/or the like. The rear flange 33*e* may be attached to a rear wall of the first mounting bracket 31 and a rear wall of the second mounting bracket 32 by welding, using fasteners, and/or the like.

A front mounting hardware member 41 may be joined to the subframe mounting bracket assembly 30. The front mounting hardware member 41 may extend through the support wall 33*a* of the reinforcing member 33 and the mounting wall 35 of the first mounting bracket 31. The front mounting hardware member 41 may be joined to the support wall 33*a* of the reinforcing member 33 and the mounting wall 35 of the first mounting bracket 31 by welding and/or the like, and the front mounting hardware member 41 may be a pipe nut having a cylindrical shape.

Referring to FIG. 1, a bumper beam 19 may extend in the width direction of the vehicle, and both end portions of the bumper beam 19 may be mounted to the pair of bumper beam mounting brackets 18 through a pair of crash boxes 19*a*, respectively. A front end of each crash box 19*a* may be joined to the end portion of the bumper beam 19 by welding, using fasteners, and/or the like, and a rear end of each crash box 19*a* may be joined to the bumper beam mounting bracket 18 by welding, using fasteners, and/or the like, and thus the crash box 19*a* may connect the corresponding bumper beam mounting bracket 18 and the corresponding end portion of the bumper beam 19. The bumper beam mounting bracket 18 may be connected to both the front end portion 14*a* of the fender apron member 14 and the front end portion 13*a* of the front side member 13 through the subframe mounting bracket assembly 30, and accordingly support stiffness of the bumper beam mounting bracket 18, connection stiffness of the crash box 19*a*, and stiffness of the bumper beam 19 may be improved. Thus, as illustrated in FIG. 14, the initial peak P1 of the crash pulse may be increased.

Figure 2:
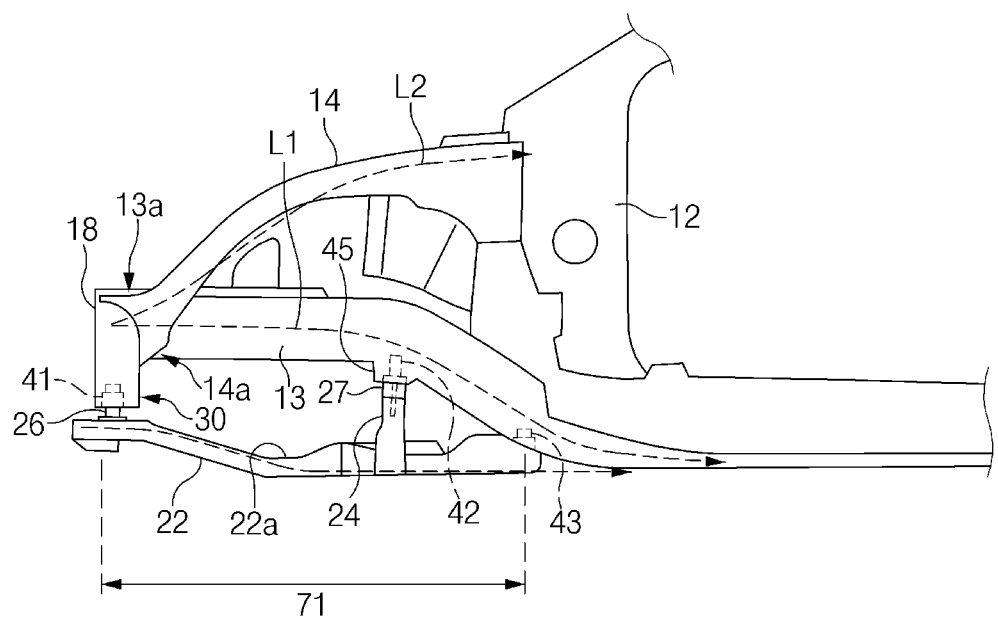
FIG. 2 illustrates a side view of a vehicle front structure according to an exemplary form of the present disclosure.

The front subframe 20 may be mounted to the front side member 13, the subframe mounting bracket assembly 30, and the floor member 55. Referring to FIG. 2, a length 71 between a front portion of the front subframe 20 and a rear portion of the front subframe 20 may be determined to absorb crash impact energy of the vehicle.

Figure 7:
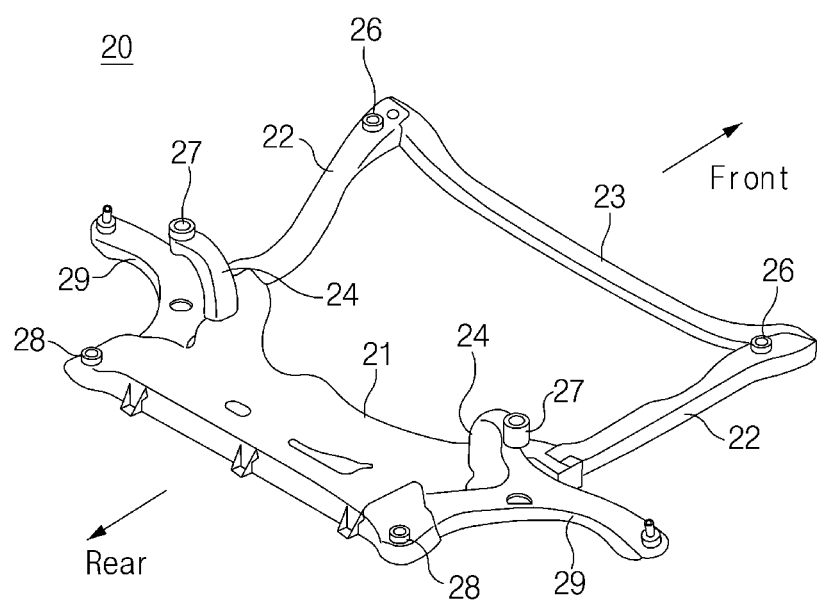
FIG. 7 illustrates a perspective view of a front subframe mounted on a vehicle front structure according to an exemplary form of the present disclosure.

Referring to FIGS. 7 and 8, the front subframe 20 may have a front end portion facing the front of the vehicle and a rear end portion facing the rear of the vehicle. The front subframe 20 may include a pair of front mounting bushes 26 located in the front end portion thereof, a pair of rear mounting bushes 28 located in the rear end portion thereof, and a pair of center mounting bushes 27 located between the front mounting bushes 26 and the rear mounting bushes 28. The front mounting bush 26 may be mounted to the front mounting hardware member 41 of the subframe mounting bracket assembly 30 through a front fastener 51, and the rear mounting bush 28 may be mounted to the front end portion 55*a* of the floor member 55 through a rear fastener 53. The center mounting bush 27 may be mounted to the center mounting portion 45 of the front side member 13 through a center fastener 52.

Referring to FIG. 7, the front subframe 20 may include a center crossmember 21, a pair of longitudinal members 22 extending from the center crossmember 21 toward the front of the vehicle, and a front crossmember 23 connecting front end portions of the pair of longitudinal members 22.

A pair of suspension arms 29 may be connected to both left and right sides of the center crossmember 21. A pair of attachment arms 24 may extend from the center crossmember 21 toward the front side members 13. The center mounting bush 27 may be located on a top end of the attachment arm 24. The center mounting bush 27 may be mounted to the center mounting hardware member 42 of the center mounting portion 45 of the front side member 13 through the center fastener 52. The center mounting bush 27 may be made of a material having lower strength than that of the vehicle body and the front subframe 20. For example, the center mounting bush 27 may be made of a resin material such as plastic. Thus, in the event of a frontal collision of the vehicle, the center mounting bush 27 may be destructed earlier than the front subframe 20 so that the attachment arm 24 of the center crossmember 21 may be easily released from the center mounting portion 45 of the front side member 13.

Figure 12:
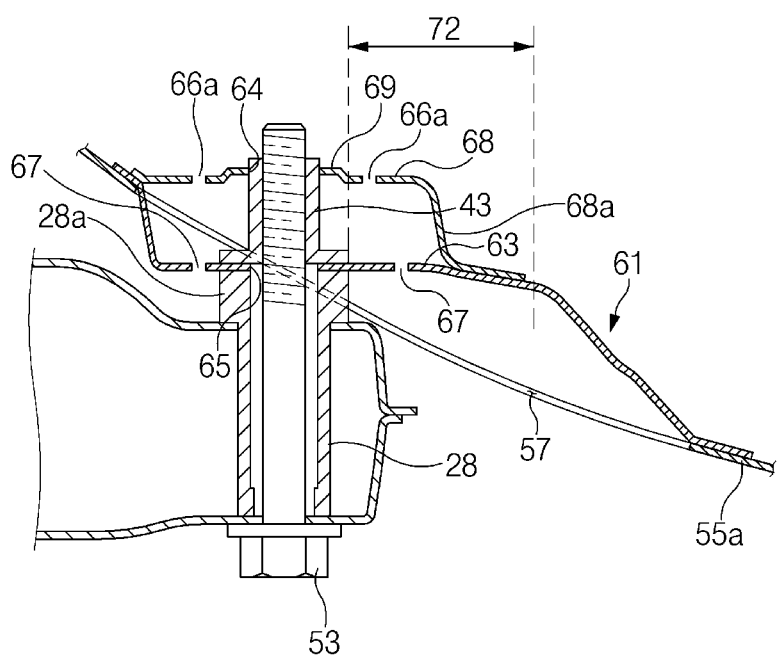
FIG. 12 illustrates a cross-sectional view, taken along line B-B of FIG. 10.

The rear mounting bush 28 may be located in a rear portion of the center crossmember 21, and the rear mounting bush 28 may be one-piece construction with the rear portion of the center crossmember 21. The rear mounting bush 28 may be mounted to the rear mounting hardware member 43 of the floor member 55 by the rear fastener 53 (see FIGS. 8 and 12). Referring to FIG. 12, the rear mounting bush 28 may be located within the center crossmember 21, and a protrusion 28*a* may protrude from a top end of the rear mounting bush 28. An outer diameter of the protrusion 28*a* may be greater than an outer diameter of the rear mounting bush 28.

Each longitudinal member 22 may extend from a front end of the center crossmember 21 toward the front of the vehicle. The longitudinal member 22 may extend upwardly and obliquely from the front end of the center crossmember 21 toward the subframe mounting bracket assembly 30. The longitudinal member 22 may have a flat portion 22*a* extending horizontally from the front end of the center crossmember 21, and the flat portion 22*a* may be located at a lower height than a front end portion of the longitudinal member 22. The flat portion 22*a* may act as a notch that induces a deformation of the longitudinal member 22. As illustrated in FIG. 13, in the event of a frontal impact/collision of the vehicle, when an impact load is transferred along the longitudinal member 22, the longitudinal member 22 may be deformed (bent) into a V-like shape (see reference numeral 81 in FIG. 13) by the flat portion 22*a*.

Figure 9:
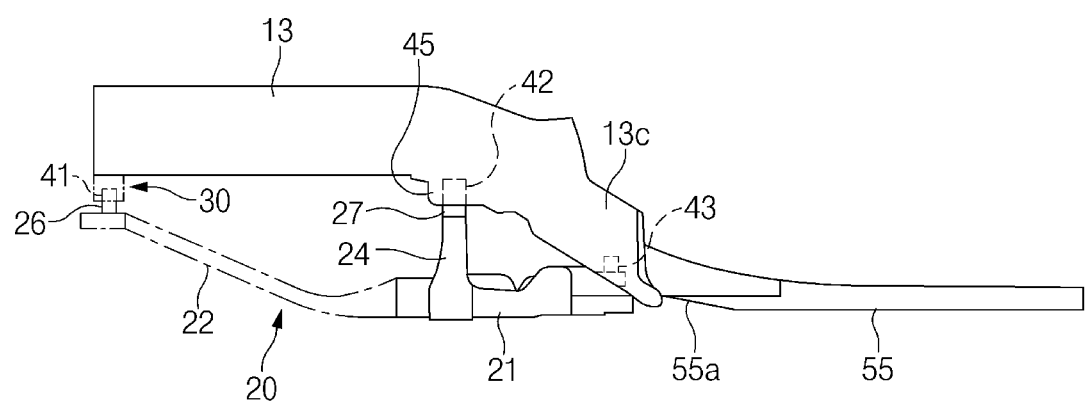
FIG. 9 illustrates a side view of a state in which a front subframe is mounted to a front side member in a vehicle front structure according to an exemplary form of the present disclosure.
Figure 10:
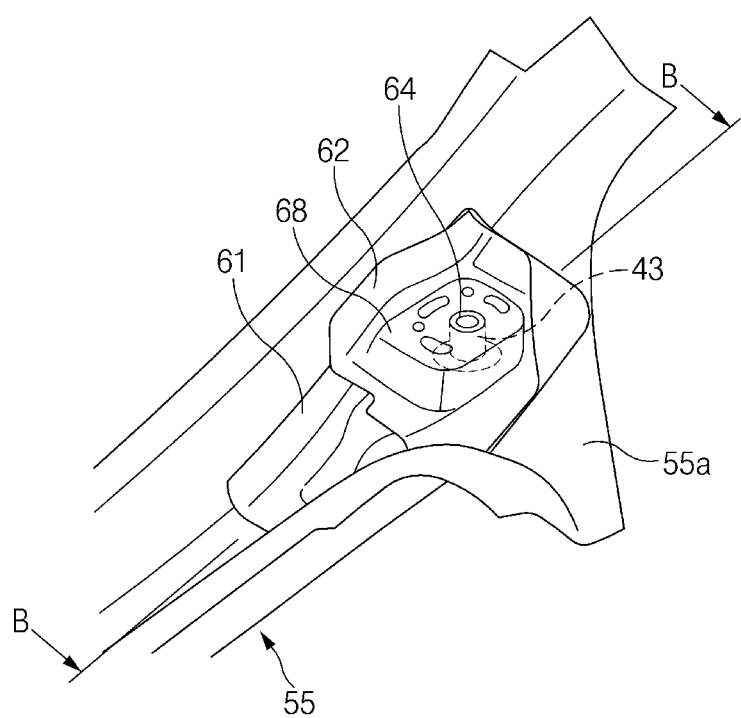
FIG. 10 illustrates a perspective view of a state in which a rear mounting hardware member is mounted to a front end portion of a floor member through a rear reinforcing member and a bulkhead in a vehicle front structure according to an exemplary form of the present disclosure.
Figure 11:
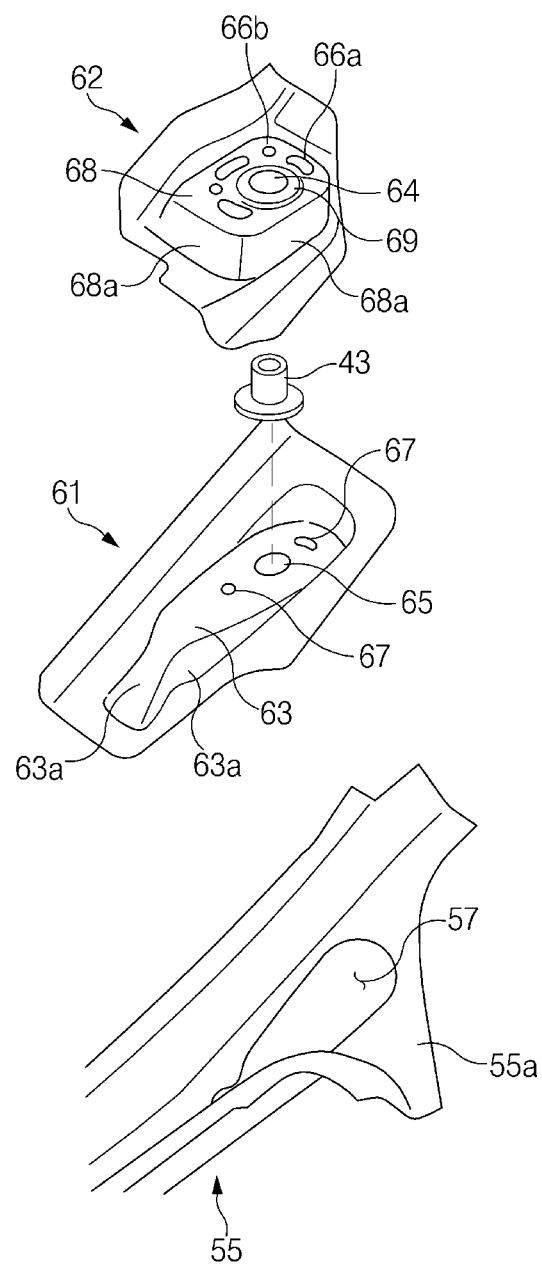
FIG. 11 illustrates an exploded perspective view of a state in which the rear mounting hardware member, the rear reinforcing member, and the bulkhead are released from the front end portion of the floor member illustrated in FIG. 10.

Referring to FIGS. 8 and 9, each longitudinal member 22 may have the front mounting bush 26 located in the front end portion thereof, and the front mounting bush 26 may be one-piece construction with the front end portion of the front subframe 20. The front mounting bush 26 may be joined to the front mounting hardware member 41 of the subframe mounting bracket assembly 30 by the front fastener 51 (see FIG. 8).

Referring to FIGS. 9 to 12, the rear mounting hardware member 43 may be mounted to the front end portion 55a of the floor member 55 through a rear reinforcing member 61 and a bulkhead 62. The front end portion 55a of the floor member 55 may have an opening 57, and the opening 57 may have a slot shape extending in the longitudinal direction of the vehicle. The rear mounting hardware member 43 and the protrusion 28a of the rear mounting bush 28 may extend through the opening 57. In particular, as a length of the opening 57 is greater than a diameter of the rear mounting hardware member 43 and a diameter of the protrusion 28a, the rear mounting hardware member 43 and the protrusion 28a of the rear mounting bush 28 may be allowed to move toward the rear of the vehicle along the opening 57 during the frontal collision of the vehicle, and thus the rear mounting hardware member 43 and the rear mounting bush 28 may be easily released from the front end portion 55a of the floor member 55. Since the rear mounting hardware member 43 and the rear mounting bush 28 move toward the rear of the vehicle along the opening 57 of the floor member 55 in the event of the frontal collision of the vehicle, a late peak P2 of the crash pulse may be reduced and a pulse P3 in a tertiary crash section S3 may be delayed as illustrated in FIG. 14.

The rear reinforcing member 61 may be disposed above the opening 57 of the front end portion 55a of the floor member 55, and edges of the rear reinforcing member 61 may be joined to the periphery of the opening 57 of the floor member 55 by welding, using fasteners, and/or the like. The rear reinforcing member 61 may have a support wall 63 to which a bottom surface of the rear mounting hardware member 43 is fixed. The support wall 63 may be a horizontally flat wall, and the support wall 63 may be supported by a sidewall 63a.

A portion of the rear reinforcing member 61 may extend through the opening 57 of the floor member 55. Referring to FIG. 12, a front portion of the support wall 63 of the rear reinforcing member 61 may extend through the opening 57 of the floor member 55, and thus an impact energy absorption distance 72 from the rear mounting hardware member 43 and the protrusion 28a to a rear portion of the support wall 63 may be secured. The support wall 63 may have a mounting hole 65 through which the rear fastener 53 passes. The rear mounting hardware member 43 may be a pipe nut to which the rear fastener 53 is fastened. The rear mounting hardware member 43 may be aligned with the mounting hole 65 of the support wall 63, and the bottom surface of the rear mounting hardware member 43 may be fixed to the support wall 63 of the rear reinforcing member 61 by welding and/or the like. A plurality of through holes 67 may be located around the mounting hole 65, and accordingly, in the event of the frontal collision of the vehicle, the rear mounting hardware member 43 may easily break the support wall 63 of the rear reinforcing member 61 through the plurality of through holes 67. Thus, the rear mounting hardware member 43 and the rear mounting bush 28 may be easily released from the floor member 55.

According to an exemplary form, the rear reinforcing member 61 may be made of a material having lower stiffness and strength than that of the rear mounting hardware member 43, the floor member 55, and the bulkhead 62. For example, the material of the rear reinforcing member 61 may be mild steel. In the event of a frontal collision of the vehicle, when an impact load is applied to the rear mounting hardware member 43, the rear reinforcing member 61 may be easily torn. Thus, the rear mounting hardware member 43 and the rear mounting bush 28 may be easily released from the front end portion 55a of the floor member 55.

The bulkhead 62 may be disposed on the rear mounting hardware member 43 to cover the rear mounting hardware member 43 and the support wall 63 of the rear reinforcing member 61. The bulkhead 62 may be joined to the rear reinforcing member 61 by welding, using fasteners, and/or the like. The bulkhead 62 may have a cover wall 68 covering the rear mounting hardware member 43 and the support wall 63 of the rear reinforcing member 61, and the cover wall 68 may be horizontally flat. The cover wall 68 may be supported by a sidewall 68a. The cover wall 68 may be parallel to the support wall 63 of the rear reinforcing member 61. The cover wall 68 may have an insertion hole 64 to which a top portion of the rear mounting hardware member 43 is inserted, and the top portion of the rear mounting hardware member 43 may be fixed to the insertion hole 64 by welding and/or the like. In addition, a reinforcing bead 69 may be provided around the insertion hole 64, and the reinforcing bead 69 may be raised upwardly from the cover wall 68.

A plurality of through holes 66a and 66b may be located around the insertion hole 64. The plurality of through holes 66a and 66b may include slot-shaped through holes 66a and circular through holes 66b. In the event of the frontal collision of the vehicle, the rear mounting hardware member 43 may easily break the cover wall 68 of the bulkhead 62 through the plurality of through holes 66a and 66b, and thus the rear mounting hardware member 43 and the rear mounting bush 28 may be easily released from the floor member 55.

In theory, in order to reduce the crash pulse severity during a frontal collision, the amount of dynamic deformation may be increased by increasing the initial peak P1 of the crash pulse and reducing the late peak P2 of the crash pulse, and thus the pulse P3 in the tertiary crash section may be delayed. FIG. 14 illustrates a crash pulse, in which the crash pulse is an acceleration curve measured in the vehicle during a crash test. Referring to FIG. 14, the initial peak P1 in a primary crash section S1 of the crash pulse with respect to the vehicle front structure according to an exemplary form of the present disclosure may be increased, compared to an initial peak V1 with respect to a vehicle front structure according to the related art, and the late peak P2 in a secondary crash section S2 of the crash pulse with respect to the vehicle front structure according to an exemplary form of the present disclosure may be reduced, compared to a late peak V2 with respect to the related art vehicle front structure. The pulse P3 in the tertiary crash section S3 with respect to the vehicle front structure according to an exemplary form of the present disclosure may be delayed, compared to a pulse V3 with respect to the related art vehicle front structure.

As set forth above, the vehicle front structure according to exemplary forms of the present disclosure may effectively induce the deformation of the front subframe and the front side member into a diamond shape in the event of a frontal impact/collision, thereby significantly improving the crash pulse severity, and may sufficiently absorb the crash impact energy, thereby protecting the passenger compartment safely.

According to exemplary forms of the present disclosure, during the frontal impact/collision of the vehicle, the longitudinal member 22 is deformed (bent) into a V-like shape (see reference numeral 81 in FIG. 13) by the flat portion 22a while the front side member 13 is deformed (bent) into an inverted V-like shape (see reference numeral 82 in FIG. 13) by the center mounting portion 45, and thus the front subframe 20 and the front side member 13 may be deformed into a diamond shape as a whole, resulting in reduced crash pulse severity.

According to exemplary forms of the present disclosure, the front end portion 14a of the fender apron member 14 and the front end portion 13a of the front side member 13 may be connected side-by-side in the width direction of the vehicle, thereby improving the stiffness and strength of the front portion of the vehicle front structure 10. Each bumper beam mounting bracket 18 may be connected to both the front end portion 14a of the fender apron member 14 and the front end portion 13a of the front side member 13 through the subframe mounting bracket assembly 30, and accordingly the support stiffness of the bumper beam mounting bracket 18, the connection stiffness of the crash box 19a, and the stiffness of the bumper beam 19 may be improved. Thus, as illustrated in FIG. 14, the initial peak P1 of the crash pulse may be increased.

According to exemplary forms of the present disclosure, in the event of the frontal impact/collision of the vehicle, after the center mounting bush 27 is released from the center mounting hardware member 42 and the rear mounting bush 28 is released from the rear mounting hardware member 43, the rear mounting hardware member 43 and the rear mounting bush 28 of the front subframe 20 may move toward the rear of the vehicle along the opening 57 of the floor member 55, and thus the dynamic deformation may be increased. As illustrated in FIG. 14, the late peak P2 of the crash pulse may be reduced, and the pulse P3 in the tertiary crash section S3 may be delayed.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle front structure for a vehicle, comprising:
a front side member;
a fender apron member having a front end portion connected to a front end portion of the front side member;
a subframe mounting bracket assembly mounted to the front end portion of the front side member and the front end portion of the fender apron member; and
a first subframe disposed under the front side member,
wherein the front end portion of the front side member and the front end portion of the fender apron member are connected side-by-side in a width direction of the vehicle.

2. The vehicle front structure according to claim 1, wherein the subframe mounting bracket assembly includes: a first mounting bracket joined to the front end portion of the front side member, a second mounting bracket joined to the front end portion of the fender apron member, and a reinforcing member connecting the first mounting bracket and the second mounting bracket.

3. The vehicle front structure according to claim 2, wherein the front end portion of the fender apron member has a plurality of flanges attached to the second mounting bracket.

4. The vehicle front structure according to claim 2, wherein:
the first mounting bracket includes a mounting wall disposed on a bottom end thereof,
the reinforcing member includes a support wall parallel to the mounting wall, and
a front mounting hardware member extends through and is joined to the support wall and the mounting wall.

5. The vehicle front structure according to claim 4, further comprising a front subframe including:
a front mounting bush located in a front end portion of the front subframe;
a rear mounting bush located in a rear end portion of the front subframe; and
a center mounting bush located between the front mounting bush and the rear mounting bush, and
wherein the front mounting bush is mounted to the front mounting hardware member through a front fastener.

6. The vehicle front structure according to claim 5, wherein: the center mounting bush is mounted to the front side member through a center fastener, and
the center mounting bush is made of a material having lower strength than a strength of the front subframe.

7. The vehicle front structure according to claim 6, wherein the front side member has a center mounting portion protruding downwardly from a bottom surface thereof,
a center mounting hardware member is fixed into the center mounting portion, and
the center mounting bush is mounted to the center mounting hardware member through the center fastener.

8. The vehicle front structure according to claim 5, wherein:
a floor member is connected to the front side member,
the floor member has a front end portion joined to the front side member, and
the rear mounting bush is mounted to the front end portion of the floor member through a rear fastener.

9. The vehicle front structure according to claim 8, wherein:
a rear mounting hardware member is mounted to the front end portion of the floor member through a rear reinforcing member and a bulkhead, and
the rear mounting bush is mounted to the rear mounting hardware member through the rear fastener.

10. The vehicle front structure according to claim 9, wherein:
the front end portion of the floor member has an opening extending in a longitudinal direction of the vehicle, and
the rear mounting hardware member and a top portion of the rear mounting bush extend through the opening of the floor member.

11. The vehicle front structure according to claim 10, wherein:
the rear reinforcing member is disposed above the opening of the floor member, and
the rear reinforcing member is made of a material having lower stiffness than a stiffness of the rear mounting hardware member, the floor member, and the bulkhead.

12. The vehicle front structure according to claim 9, wherein:
the rear reinforcing member includes a support wall to which a bottom surface of the rear mounting hardware member is fixed,
the support wall has a mounting hole through which the rear fastener passes, and
a plurality of through holes is located around the mounting hole.

13. The vehicle front structure according to claim 12, wherein:
- the bulkhead is disposed on the rear mounting hardware member to cover the rear mounting hardware member and the support wall of the rear reinforcing member, and
- the bulkhead is joined to the rear reinforcing member.

14. The vehicle front structure according to claim 12, wherein:
- the bulkhead has a cover wall covering the rear mounting hardware member and the support wall of the rear reinforcing member,
- the cover wall has an insertion hole into which a top portion of the rear mounting hardware member is inserted, and
- a plurality of through holes is located around the insertion hole.

15. The vehicle front structure according to claim 1, further comprising a front subframe including:
- a center crossmember;
- a pair of longitudinal members extending upwardly and obliquely from the center crossmember toward a front of the vehicle, and
- a front crossmember connecting front end portions of the pair of longitudinal members, wherein:
- each longitudinal member of the pair of longitudinal members has a flat portion extending horizontally from a front end of the center crossmember, and
- the flat portion is located at a lower height than a front end portion of the longitudinal member.

* * * * *